United States Patent
Yu et al.

(10) Patent No.: US 12,166,189 B2
(45) Date of Patent: Dec. 10, 2024

(54) DISASSEMBLING AND DISCHARGING DEVICE FOR BATTERY RECYCLING

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Aixia Li, Guangdong (CN); Yinghao Xie, Guangdong (CN); Xuemei Zhang, Guangdong (CN); Kang Chen, Guangdong (CN); Changdong Li, Guangdong (CN)

(73) Assignees: GUANGDONG BRUNP RECYCLING TECHNOLOGY CO. LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/555,847

(22) PCT Filed: May 31, 2022

(86) PCT No.: PCT/CN2022/096310
§ 371 (c)(1),
(2) Date: Oct. 17, 2023

(87) PCT Pub. No.: WO2023/005407
PCT Pub. Date: Feb. 2, 2023

(65) Prior Publication Data
US 2024/0097229 A1    Mar. 21, 2024

(30) Foreign Application Priority Data

Jul. 30, 2021    (CN) .......................... 202110872373.8

(51) Int. Cl.
*H01M 10/54*    (2006.01)
*B01D 33/01*    (2006.01)
(Continued)

(52) U.S. Cl.
CPC ........ *H01M 10/54* (2013.01); *B01D 33/0183* (2013.01); *B09B 3/35* (2022.01); *H01M 6/52* (2013.01); *B09B 2101/16* (2022.01)

(58) Field of Classification Search
CPC .............................. B02C 21/00; H01M 10/54
(Continued)

(56) References Cited

U.S. PATENT DOCUMENTS

2015/0283733 A1*  10/2015  Ito ........................... B02C 21/00
                                                                  241/60

FOREIGN PATENT DOCUMENTS

CN    106602164 A    4/2017
CN    109395852 A    3/2019
(Continued)

OTHER PUBLICATIONS

International Search Report for PCT/CN2022/096310 mailed Aug. 9, 2022, ISA/CN.

*Primary Examiner* — Christopher L Templeton
*Assistant Examiner* — P Derek Pressley
(74) *Attorney, Agent, or Firm* — Yue (Robert) Xu; Apex Attorneys at Law, LLP

(57) ABSTRACT

A disassembling and discharging device for battery recycling includes a crushing assembly, a high pressure tank, at least one pressure relief tank, and a filtering tank. The crushing assembly is provided with a first feed port and a (Continued)

first discharge port communicated with the first feed port; the high pressure tank is provided with a first inner cavity for containing discharging liquid, and the first inner cavity is communicated with the first discharge port; the pressure relief tank is provided with a second inner cavity, and the second inner cavity is communicated with the first inner cavity; and the filtering tank is provided with a third inner cavity, and the third inner cavity is communicated with the second inner cavity.

7 Claims, 5 Drawing Sheets

(51) Int. Cl.
*B09B 3/35* (2022.01)
*B09B 101/16* (2022.01)
*H01M 6/52* (2006.01)

(58) Field of Classification Search
USPC .......................................................... 241/68
See application file for complete search history.

(56) References Cited

FOREIGN PATENT DOCUMENTS

| | | | |
|---|---|---|---|
| CN | 209061091 U | | 7/2019 |
| CN | 111872021 | * | 11/2020 |
| CN | 111872021 A | | 11/2020 |
| CN | 212783576 U | | 3/2021 |
| CN | 113782856 A | | 12/2021 |
| JP | 2004355954 A | | 12/2004 |
| KR | 101647133 | * | 8/2016 |
| KR | 20200052761 A | | 5/2020 |

* cited by examiner

DISASSEMBLING AND DISCHARGING DEVICE FOR BATTERY RECYCLING

The present application is a National Phase entry of PCT Application No. PCT/CN2022/096310, filed on May 31, 2022, which claims priority to Chinese Patent Application No. 202110872373.8, titled "DISASSEMBLING AND DISCHARGING DEVICE FOR BATTERY RECYCLING", filed on Jul. 30, 2021 with the China National Intellectual Property Administration, which are incorporated herein by reference in their entireties.

FIELD

The present application relates to the technical field of battery recycling, in particular to a disassembling and discharging device for battery recycling.

BACKGROUND

In the process of battery recycling, the battery casing needs to be disassembled after the recycled battery being discharged, and then the discarded powder of the recycled battery therein can be obtained. The powder for battery is reprocessed to obtain raw materials for the cathode for a new battery. However, current batteries need to be immersed and discharged for a few days before being disassembled, which cannot be disassembled very quickly, and thus the disassembling efficiency to the battery is decreased.

SUMMARY

The present application is direct to solve at least one of the technical problems existing in the conventional art. For this end, the present application provides a disassembling and discharging device for battery recycling, which can improve the disassembling efficiency to the battery.

The disassembling and discharging device for battery recycling according to the present application includes a crushing assembly, a high-pressure tank, at least one depressurization tank, and a filter tank. The crushing assembly is provided with a first feeding inlet and a first discharge outlet communicated with the first feeding inlet; the high-pressure tank is provided with a first inner cavity in which a discharge liquid is accommodated, and the first inner cavity is communicated with the first discharge outlet; a depressurization tank is provided with a second inner cavity, which is communicated with the first inner cavity; the filter tank is provided with a third inner cavity and a second discharge outlet which is communicated with the third inner cavity, and the third inner cavity is communicated with the second inner cavity.

The disassembling and discharging device for battery recycling according to the present application has at least the following beneficial effects.

The battery recycling process is as follows: firstly, the battery is put into the crushing assembly and crushed into powder for battery. The powder for battery enters the first inner cavity through the first discharge outlet. At this time, the powder for battery contacts with discharge liquid and reacts and the high-pressure tank is in a high-pressure state. The pressure in the high-pressure tank can be reduced by providing at least one depressurization tank, so that the powder for battery can be continuously discharging. The discharged powder for battery is recycled at the second discharge outlet to ensure that the entire disassembling and discharging process can be continuously running, thereby improving the disassembling efficiency to the battery.

According to some embodiments of the present application, the depressurization tank includes a first tank body, a first cover, and a buffer mechanism. The first cover is elastically and sliding connected to the first tank body through the buffer mechanism, which enables the depressurization tank to be with a good depressurization function and thus the pressure in the high-pressure tank can be continuously decreasing to ensure that the entire disassembling and discharging process can be continuously running, thereby improving the disassembling efficiency to the battery.

According to some embodiments of the present invention, a second elastic member is provided between the limiting member and the first connecting member for improving the buffering and depressurization capability of the buffering mechanism.

According to some embodiments of the present application, the crushing assembly includes a discharging pipe and a crushing mechanism accommodated in the discharging pipe, and the first feeding inlet is communicated with the first discharge outlet through the discharging pipe. A first check plate is provided in the inner wall of the discharging pipe. The crushing mechanism includes at least two crushing teeth, the engagement of two adjacent crushing teeth can effectively crunch the battery and facilitate crushing the battery so as to perform disassembling and discharging in the high-pressure tank.

According to some embodiments of the present invention, the crushing assembly further includes a sealed chamber. Both the punching mechanism and the discharging pipe are accommodated in the sealed chamber, and both the first feeding inlet and the first discharge outlet are provided in the sealed chamber, which prevents the high-pressure in the high-pressure tank from flushing the water flow out of the sealed chamber, thereby improving the working safety of the disassembling and discharging device for battery.

According to some embodiments of the present invention, the filter tank includes a second tank body and a second cover, the second tank is provided with a support rack for supporting the filter, the second cover is connected with a third connecting member capable of contacting the filter, and the second cover is detachably connected to the second tank for facilitating the mounting of the filter, thereby improving the filtering effect.

According to some embodiments of the present invention, a feeding mechanism is further provided. The discharge end of the feeding mechanism is communicated with the first feeding inlet for continuously feeding materials to the crushing assembly, so as to increase the disassembling rate of the battery.

According to some embodiments of the present invention, a punching mechanism is further provided. The punching mechanism is provided with a punching pipe. The first inner cavity is communicated with the first discharge outlet through the punching pipe. A second check plate is provided in the inner wall of the material pipe, which can improve the discharging efficiency to the battery.

According to some embodiments of the present invention, a first feeding pipe is connected with the bottom of the first inner cavity and the bottom of the third inner cavity, and a second feeding pipe is connected with the bottom of the second inner cavity and the bottom of the third inner cavity. Both the first feeding pipe and the second feeding pipe are provided with a feeding pump, which facilitates the filter tank filtering the discharged battery.

The additional aspects and advantages of the present application will be given in the following description, and some of those will be apparent from the following description or be understood from the practice of the present application.

BRIEF DESCRIPTION OF THE DRAWINGS

The above and/or additional aspects and advantages of the present application will become obvious and easy to understand from the description of the embodiments in conjunction with the following drawings, in which.

Figure 1:
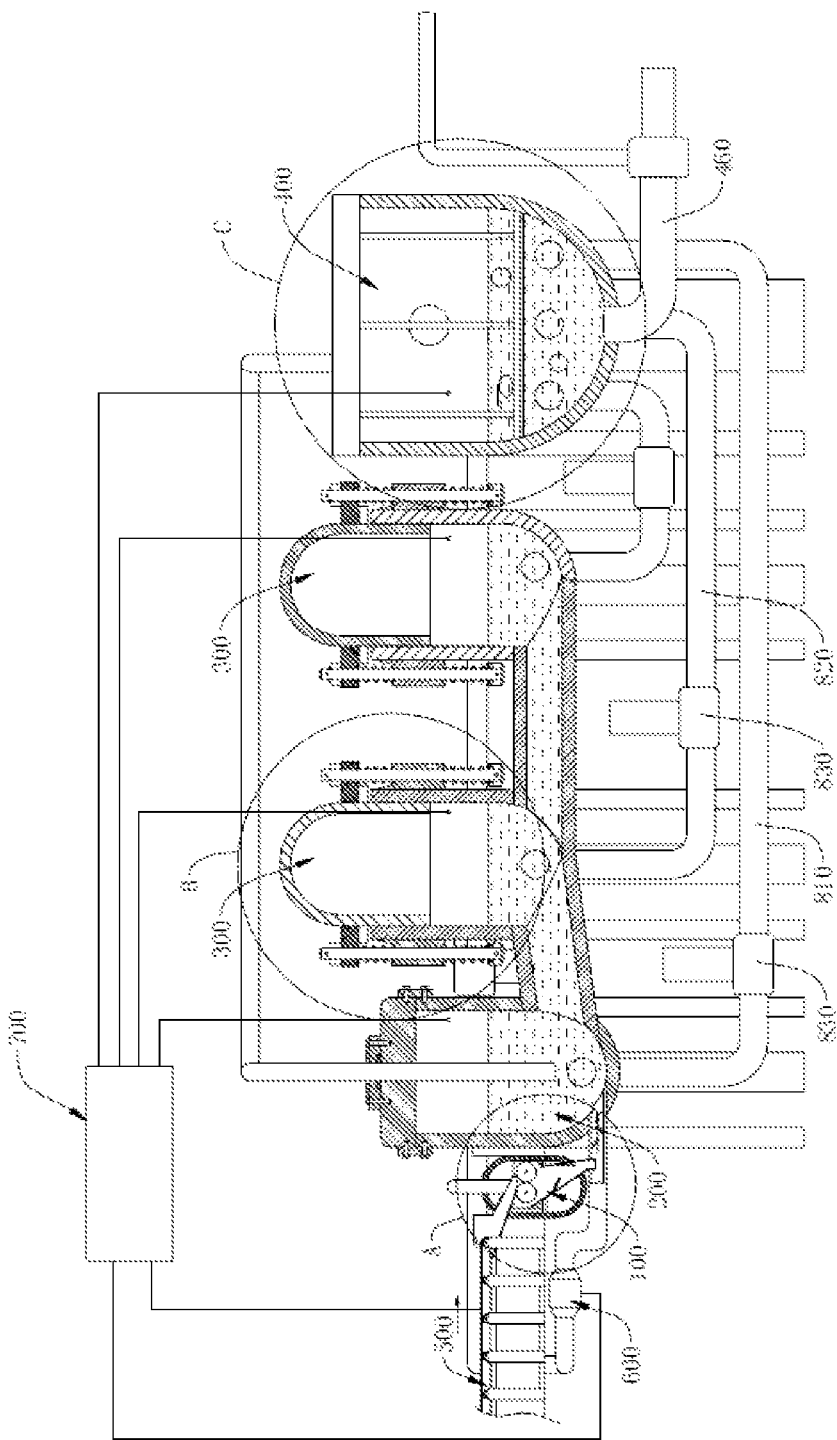
FIG. 1 is a schematic structural view of a disassembling and discharging device for battery recycling according to an embodiment of the present application.

NUMERAL REFERENCE crushing assembly 100, first feeding inlet 110, first discharge outlet 120, discharging pipe 130, first check plate 131, crushing teeth 140, sealed chamber 150, blowing pipe 160, high-pressure tank 200, first inner cavity 210, depressurization tank 300, second inner cavity 310, first tank body 320, first cover 330, buffer mechanism 340, first connecting member 341, second connecting member 342, first elastic member 343, stopper 344, second elastic member 345, filter tank 400, third inner cavity 410, filter 420, second tank body 430, support rack 431, second cover 440, third connecting member 441, second discharge outlet 450, discharge pipe 460, discharge pump 470, feeding mechanism 500, punching mechanism 600, punching pipe 610, second check plate 611, punching passage 612, high-pressure pump 620, control module 700, sensor 710, first feeding pipe 810, second feeding pipe 820, feeding pump 830, discharge liquid 900, pressure relief valve 990.

DETAILED DESCRIPTION OF THE EMBODIMENTS

The embodiments of the present application will be described in detail below. Examples of the embodiments are shown in the accompanying drawings, in which the same or similar elements or elements with the same or similar functions will be designated by the same or similar reference numerals throughout the specification. The embodiments described below with reference to the accompanying drawings are exemplary, and are only configured to explain the present application, but should not be understood as limiting the present application.

In the description of the present application, it should be understood that the orientation indicated by terms "up", "down", "front", "rear", "left", "right" and the like or positional relationships are based on the orientation or positional relationships shown in the drawings, and are merely for the convenience of describing the present application and the simplification of the description, and do not indicate or imply that the device or element referred to must be in a particular orientation, or be constructed and operated in a particular orientation, and therefore should not be construed as a limit to the scope of the present application.

In the description of the present application, "several" refers to one or more, "multiple" refers to two or more, "greater", "less", "exceeding", etc. are understood to not include the number itself, and "above", "below", and "within" are understood to include the number itself. If "first" and "second" are described, which are only configured to distinguish one entity from several other entities, it cannot be understood as indicating or implying relative importance or implicitly specifying the number of the indicated technical features or implicitly specifying the order of the indicated technical features relation.

In the description of the present application, unless otherwise specified and limited, terms such as "setting", "installation", and "connection" should be understood in a broad sense, and those skilled in the art can reasonably determine the specific meaning of the above terms in the present application in combination with the specific content of the technical solution.

Referring to FIG. 1, a disassembling and discharging device for battery recycling according to the present application includes a crushing assembly 100, a high-pressure tank 200, at least one depressurization tank 300, and a filter tank 400. The crushing assembly 100 is provided with a first feeding inlet 110 and a first discharge outlet 120 communicated with the first feeding inlet 110; the high-pressure tank 200 is provided with a first inner cavity 210 in which a discharge liquid 900 is held. The first inner cavity 210 is communicated with the first discharge outlet 120. A depressurization tank 300 is provided with a second inner cavity 310, which is communicated with the first inner cavity 210. The filter tank 400 is provided with a third inner cavity 410 and a second discharge outlet 450 which is communicated with the third inner cavity 410, and the third inner cavity 410 is communicated with the second inner cavity 310. After being crushed by the crushing assembly 100, the battery can be directly discharging by providing the high-pressure tank 200 and the depressurization tank 300, thereby improving the disassembly efficiency to the battery.

Specifically, the disassembling and discharging process for battery recycling is as follows: firstly, the battery is thrown into the crushing assembly 100 and crushed into powder for battery. The powder for battery enters the first inner cavity 210 through the first discharge outlet 120. At this time, the powder for battery contacts with discharge liquid 900 and reacts and the high-pressure tank 200 is in a high pressure state. The pressure in the high-pressure tank 200 can be reduced by providing at least one depressurization tank 300, so that the powder for battery can be continuously discharging. The discharged powder for battery is recycled at the second discharge outlet 450 to ensure that the entire disassembling and discharging process can be continuously running, thereby improving the disassembling efficiency to the battery.

Figure 4:
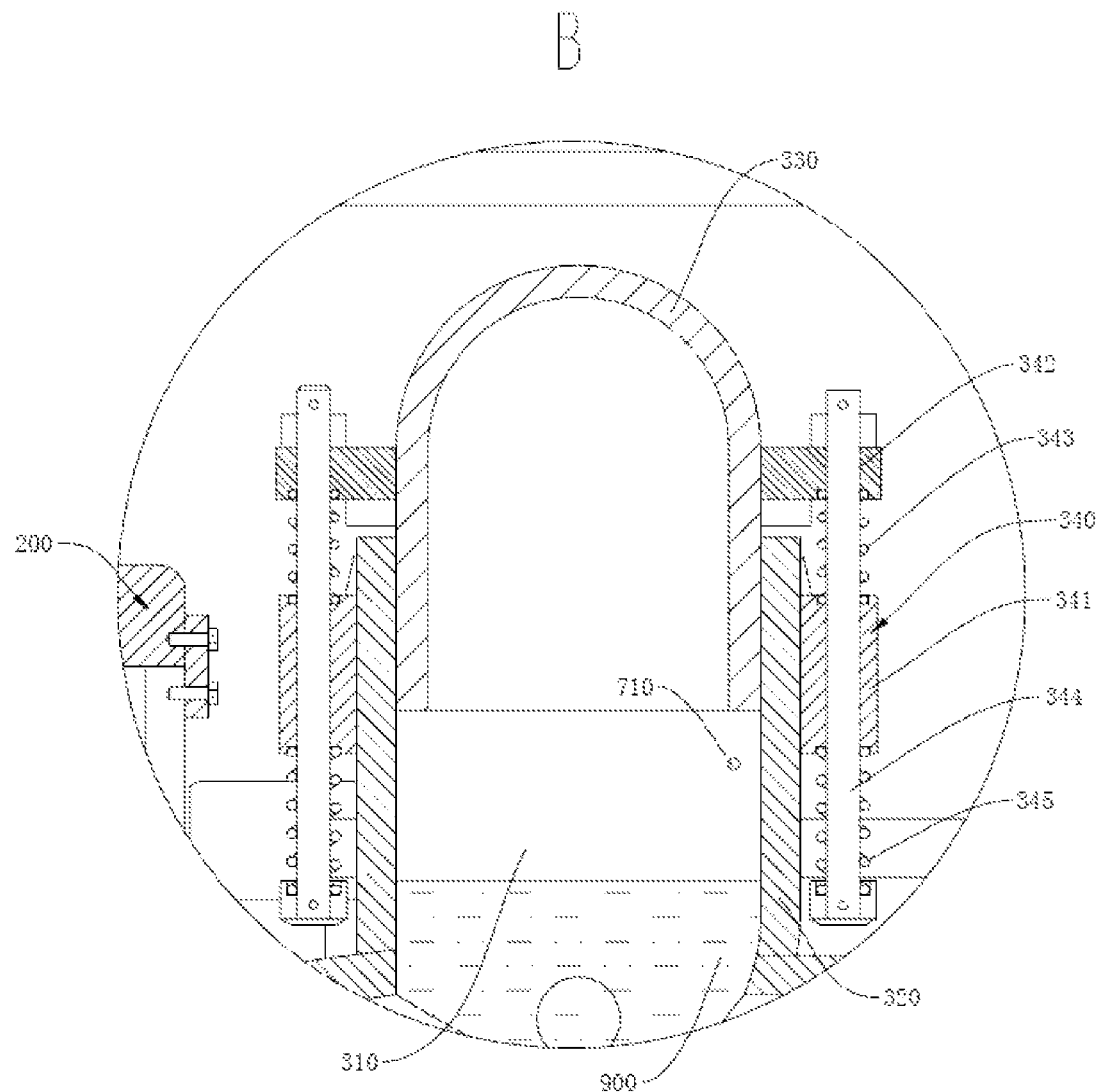
FIG. 4 is a partial enlarged view of part B shown in FIG. 1.

Referring to FIG. 4, in some embodiments of the present application, the depressurization tank 300 includes a first tank body 320, a first cover 330, and a buffer mechanism 340. The first cover 330 is elastically and slidably connected to the first tank body 320 through the buffer mechanism 340, which enables the depressurization tank 300 to be with a good depressurization function and thus the pressure in the high-pressure tank 200 can be continuously decreasing to ensure that the entire disassembling and discharging process can be continuously running, thereby improving the disassembling efficiency to the battery.

Specifically, the first cover 330 has a U-shaped structure, and the outer side wall of the first cover 330 is connected to the side wall of the second inner cavity 310, so that the first cover 330 can slide relative to the first tank body 320 up and down. By providing the buffer mechanism 340, it enables the depressurization tank 300 to be with a good depressurization function, and thus the pressure in the high-pressure tank 200 can be continuously decreasing to ensure that the entire disassembling and discharging process can be continuously running, thereby improving the disassembling efficiency to the battery.

Referring to FIG. 4, in some embodiments of the present application, the buffer mechanism 340 includes a first connecting member 341 provided to the first tank body 320, a second connecting member 342 provided to the first cover 330, and a limiting member 344. The limiting member 344 is slidably arranged to the first connecting member 341. A first elastic member 343 is connected between the first connecting member 341 and the second connecting member 342. The first connecting member 341 is elastically connected to the second connecting member 342 by the first elastic member 343, which can restrict the relative movement of the first cover 330 and the first tank body 320, so as to improve the depressurization effect of the depressurization tank 300.

Specifically, the first connecting member 341 is provided with a first mounting groove for mounting the first elastic member 343 and is fixedly connected to the first tank body 320, and the second connecting member 342 is provided with a second mounting groove for mounting the first elastic member 343 and is fixedly connected to the first cover 330. By providing the first elastic member 343 between the first connecting member 341 and the second connecting member 342, the first cover 330 can be elastically moved up and down, which can continuously depressurize the high-pressure tank 200. Also, the limiting member 344 can limit the movement of the first cap 330, so that the first cover 330 can be moved relative to the first tank body 320 in a certain range.

Certainly, in other embodiments, the limiting member 344 can also be slidably arranged to the second connecting member 342 as long as the first cover 330 can slide relative to the first tank body 320.

Referring to FIG. 4, in some embodiments of the present invention, a second elastic member 345 is provided between the limiting member 344 and the first connecting member 341 to improve the buffering and depressurization capability of the buffering mechanism 340.

Herein, both the first elastic member 344 and the second elastic member 345 have a structure of a spring, bellows, etc., and the limiting member 344 has a structure of a bolt, a screw, etc., which will not be described in detail.

Figure 3:
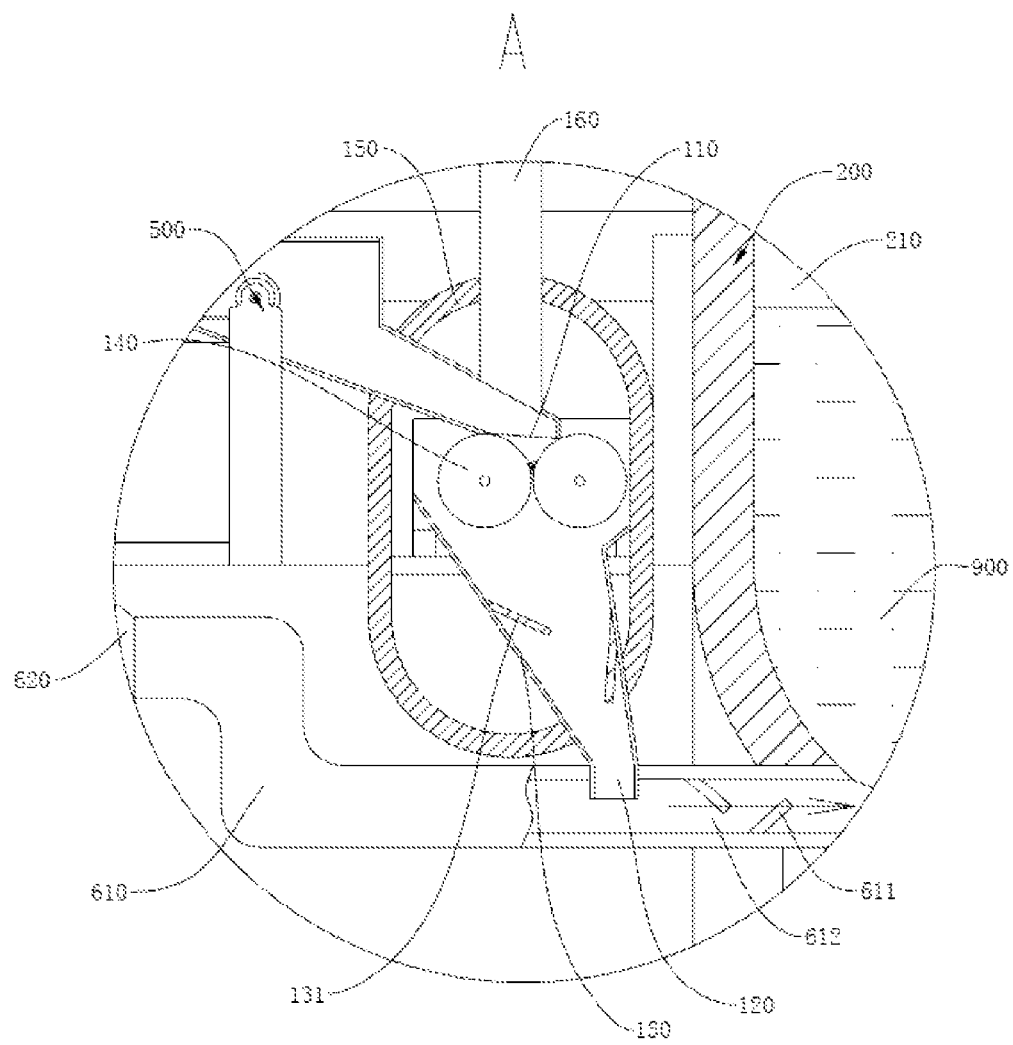
FIG. 3 is a partial enlarged view of part A shown in FIG. 1.

Referring to FIG. 3, in some embodiments of the present application, the crushing assembly 100 includes a discharging pipe 130 and a crushing mechanism accommodated in the discharging pipe 130, and the first feeding inlet 110 is communicated with the first discharge outlet 120 through the discharging pipe 130. A first check plate 131 is provided in the inner wall of the discharging pipe 130. The crushing mechanism includes at least two crushing teeth 140, the engagement of two adjacent crushing teeth 140 can effectively crack the battery and facilitate crushing the battery, so as to perform disassembling and discharging in the high-pressure tank 200.

Specifically, the crushing teeth 140 are driven by a motor to rotate about itself, and the motor controls two adjacent crushing teeth 140 to rotate in opposite directions, and the two adjacent crushing teeth 140 are engaged, which can crush the battery into powder. The first feeding inlet 110 is located above the crushing mechanism, and the first discharge outlet 120 is located below the crushing mechanism. The battery is fed into the discharge pipe 130 from the first feeding inlet 110 to be crushed by the crushing mechanism. Under the action of gravity, the crushed battery falls to the first discharge outlet 120 and thus flows into the first inner cavity 210 to be disassembled and discharged in the high-pressure tank 200, thereby improving the disassembly efficiency to the battery.

Further, a blowing pipe 160 may be provided above the first feeding inlet 110. The crushed battery is flushed rapidly to the first discharge outlet 120 by blowing air or flushing water in the blowing pipe 160, so as to improve flow rate of the crushed battery, thereby improving the disassembling efficiency to the battery.

In this way, by arranging the first check plate 131 in the inner wall of the feeding pipe 130, when the battery is discharging to generate high voltage, it can not only prevent the water flow from entering the first inner cavity 210 rapidly, but also prevent the discharging liquid from flowing out of the first feeding inlet 110, which can improve the working safety of the disassembling and discharging device for battery.

Referring to FIG. 3, in some embodiments of the present invention, the crushing assembly 100 further includes a sealed chamber 150. The discharging pipe 130 is accommodated in the sealed chamber 150, and both the first feeding inlet 110 and the first discharge outlet 120 are provided to the sealed chamber 150, so as to prevent the high-pressure in the high-pressure tank 200 from flushing the water flow out of the sealed chamber 150, which can improve the working safety of the disassembling and discharging device for battery.

Figure 5:
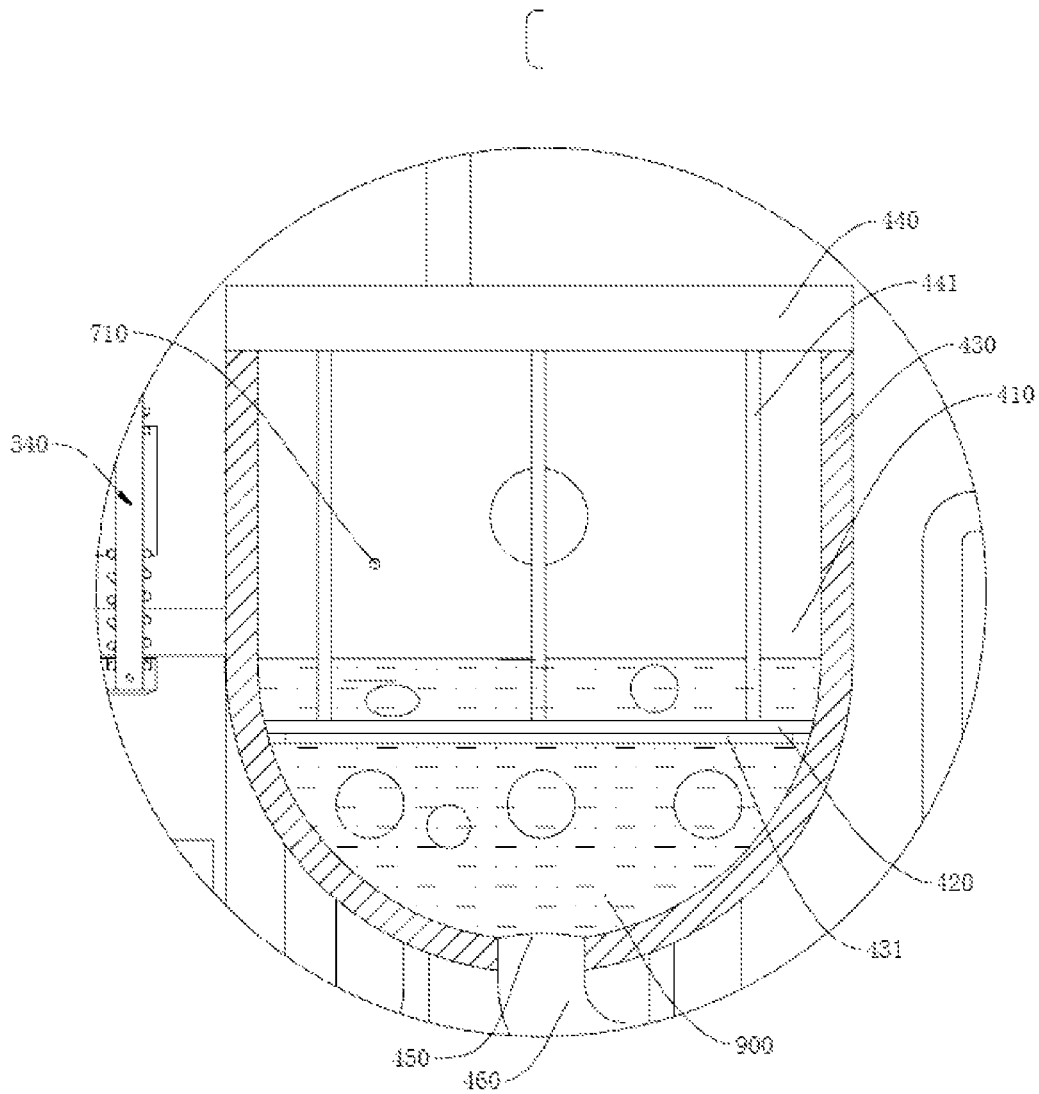
FIG. 5 is a partial enlarged view of part C shown in FIG. 1.

Referring to FIG. 5, in some embodiments of the present invention, the filter tank 400 is detachably provided with a filter 420, which can increase the service life of the filter tank 400.

Specifically, the third inner cavity 410 can be divided into a filter material area and a filtrate area by providing the filter 420. The filter material area is located below the filter 420. The discharge outlet is located at the bottom of the filter material area. The filtrate area is located above the filter 420, which facilitates separating discharged powder for battery. Also, when the filter 420 is ineffective, the filter 420 can be removed from the filter tank 400, which facilitates the replacement of the filter 420, and can improve the service life of the filter tank 400.

Also, the discharge outlet is connected with a discharge pipe 460. A discharge pump 470 is provided on the discharge pipe 460, which can rapidly draw out the discharged battery so as to improve the recycling efficiency of the disassembling and discharging device for battery recycling.

It should be noted that the filter 420 may be a filter screen or filter cotton, etc., which will not be described in detail herein.

Referring to FIG. 5, in some embodiments of the present invention, the filter tank 400 includes a second tank body 430 and a second cover 440, the second tank 430 is provided with a support rack 431 for supporting the filter 420, the second cover 440 is connected with a third connecting member 441 capable of contacting the filter 420, and the second cover 440 is detachably connected to the second tank 430 to facilitate the mounting and disassembling of the filter 420, thereby improving the filtering effect.

Specifically, since the third inner cavity 410 is communicated with the first inner cavity 210 and the second inner cavity 310 simultaneously, when the disassembling and discharging device for battery recycling is in operation, a great pressure fluctuation occurs inside the filter tank 400, which makes the filter 420 not be stationary. By providing the support rack 431 arranged in the horizontal direction and the third connecting member 441, the movement of the filter 420 in an up and down direction can be restricted so as to improve the filtering effect.

Further, the second cover 440 can be detachably connected to the second tank 430 by bolting, and a first buckle (not shown) may be provided in the side wall of the second cover 440, and a first slot (not shown) can be provided in the side wall of the second tank 430. The second cover 440 and the second tank 430 can be detachably connected by the cooperation of the first buckle and the first slot. Certainly, the positions of the first buckle and the first slot can also be interchanged.

Figure 2:
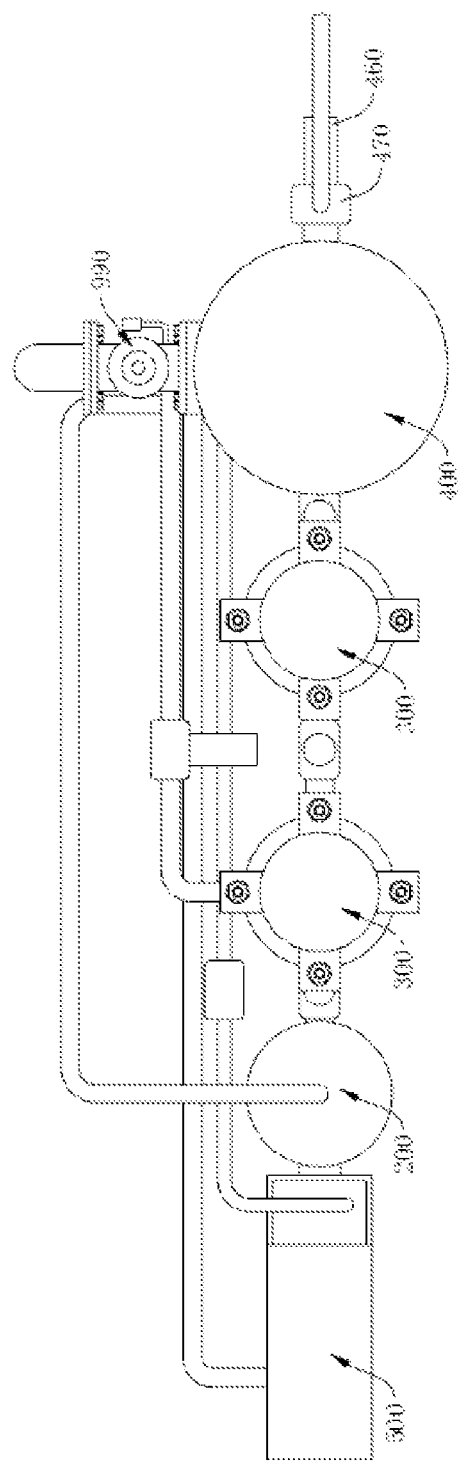
FIG. 2 is a top view of the disassembling and discharging device for battery recycling.

Referring to FIGS. 1 and 2, in some embodiments of the present invention, a feeding mechanism 500 is further provided. A discharge end of the feeding mechanism 500 is communicated with the first feeding inlet 110 to feed materials for the crushing assembly 100.

Specifically, the feeding mechanism 500 is a conveyor-belt structure, the discharge end of the conveyor-belt structure is communicated with the first feeding inlet 110, and the first feeding inlet 110 is located below the discharge end of the conveyor belt structure, so that the battery to be crushed can directly fall into the discharging pipe 130 for being crushed, which can improve the disassembling efficiency to the battery.

Referring to FIG. 1, in some embodiments of the present invention, a punching mechanism 600 is further provided. The punching mechanism 600 includes a punching pipe 610. The first inner cavity 210 is communicated with the first discharge outlet 120 through the punching pipe 610. A second check plate 611 is provided in an inner wall of the material pipe 610, so that the crushed battery can rapidly enter the first inner cavity 210 to discharge, which can improve the discharging rate and efficiency to the battery.

Specifically, the punching pipe 620 is provided with a punching passage 612, the first discharge outlet 120 is communicated with the first inner cavity 210 through the punching passage 612, and the end, away from the first inner cavity 210, of the punching pipe 610 is connected with a high-pressure pump 620. The high-pressure pump 620 can supply high pressure to pump the battery into the first inner chamber 210 through the punching passage 612, so as to improve the discharging rate and efficiency to the battery.

Further, when the battery is discharging to generate a high voltage, the battery can be prevented from fast entering the first inner cavity 210 by providing the second check plate 611 on the inner wall of the punching channel 612, which can improves the working safety of the disassembling and discharging device for battery.

Referring to FIG. 1, in some embodiments of the present invention, a first feeding pipe 810 is connected with the bottom of the first inner cavity 210 and the bottom of the third inner cavity 410, and a second feeding pipe 820 is connected with the bottom of the second inner cavity 310 and the bottom of the third inner cavity 410. Both the first feeding pipe 810 and the second feeding pipe 820 are provided with a feeding pump 830, which facilitates the filter tank 400 filtering the discharged battery.

Specifically, the feed pump 830 can pump the discharged battery in the high-pressure tank 200 into the third inner cavity 410 through the first feed pipe 810, and the feed pump 830 can pump the discharged battery in the depressurization tank 300 into the third inner cavity 410 through the second feed pipe 820, which facilitates the filter tank 400 filtering the discharged battery, so as to improve the efficiency of the disassembling and discharging device for battery recycling.

Further, in some other embodiments, referring to FIG. 2, the depressurization tank 300 and/or the filter tank 400 are/is provided with a pressure relief valve 990, which can release pressure to the depressurization tank 300 and/or the filter tank 400 in the case that the pressure in them exceeds a certain value so as to improve the work safety of the disassembling and discharging device for battery recycling.

Further, in other embodiments, the disassembling and discharging device for battery recycling is further provided with a control module 700. The high-pressure tank 200, the depressurization tank 300, and the filter tank 400 are all provided with a sensor 710, and the feeding mechanism 500, the crushing assembly 100, the punching mechanism 600 and the sensor 710 are electrically connected to the control module 700 to improve the automation level of the disassembling and discharging device for battery recycling. It is comprehensible that the sensor 710 may be a pressure sensor or a temperature sensor, or a pressure and temperature sensor with the function of measuring both pressure and temperature, which can measure the pressure and/or temperature conditions in the high-pressure tank 200, the depressurization tank 300, and the filter tank 400.

The technical features of the above-mentioned embodiments can be in any combination. For the sake of simplicity to the description, all possible combinations of the various technical features in the above-mentioned embodiments are not described. However, as long as there is no contradiction in the combination of these technical features, all should be considered as falling in the scope of this specification.

The embodiments of the present application are described in detail with reference to the accompanying drawings, but the present application is not limited to the above-mentioned embodiments. Within the cognitive scope of those skilled in the art, various changes are possible without departing from the spirit of the present invention.

What is claimed is:

1. A disassembling and discharging device for battery recycling, comprising:
   a crushing assembly provided with a first feeding inlet and a first discharge outlet connected to the first feeding inlet;
   a pressure tank provided with a pressure tank inner cavity, wherein the pressure tank inner cavity is configured to hold a discharge liquid, and the pressure tank inner cavity is communicated with the first discharge outlet;
   at least one depressurization tank provided with a depressurization tank inner cavity, wherein the depressurization tank inner cavity is communicated with the pressure tank inner cavity;
   a filter tank provided with a filter tank inner cavity and a second discharge outlet which is communicated with the filter tank inner cavity, wherein the pressure tank inner cavity is communicated with the filter tank inner cavity, and the depressurization tank inner cavity is communicated with the filter tank inner cavity,
   wherein the depressurization tank comprises a depressurization tank body, a depressurization cover, and a buffer mechanism, and the depressurization cover is slidably connected to the depressurization tank body through the buffer mechanism, wherein the crushing assembly comprises a discharging pipe and a crushing mechanism provided at the discharging pipe, the first feeding inlet is communicated with the first discharge outlet through the discharging pipe, a first check plate is provided in an inner wall of the discharging pipe, the crushing mechanism comprises at least two crushing teeth, wherein two adjacent crushing teeth are engaged, wherein the crushing assembly further comprises a sealed chamber, both the crushing mechanism and the discharging pipe are accommodated in the sealed chamber, and the first feeding inlet is provided in the sealed chamber.

2. The disassembling and discharging device for battery recycling according to claim 1, wherein the buffer mechanism comprises a first connecting member provided to the depressurization tank body, a second connecting member provided to the depressurization cover, and a limiting member, and the limiting member is slidably arranged on the first connecting member, a first elastic member is provided between the first connecting member and the second connecting member, and the first connecting member is elastically connected to the second connecting member by the first elastic member.

3. The disassembling and discharging device for battery recycling according to claim 2, wherein a second elastic member is provided between the limiting member and the first connecting member.

4. The disassembling and discharging device for battery recycling according to claim 1, wherein the filter tank comprises a filter, a filter tank body and a filter cover, and the filter tank body is provided with a support rack for supporting the filter, the filter cover is provided with a third connecting member for fixing the filter, and the filter cover is detachably connected to the filter tank body.

5. The disassembling and discharging device for battery recycling according to claim 1, further comprising a feeding mechanism, and a discharge end of the feeding mechanism is communicated with the first feeding inlet.

6. The disassembling and discharging device for battery recycling according to claim 1, further comprising a punching mechanism, and the punching mechanism is provided with a punching pipe, the pressure tank inner cavity is communicated with the first discharge outlet through the punching pipe, a second check plate is provided in an inner wall of the punching pipe.

7. The disassembling and discharging device for battery recycling according to claim 1, wherein a first feeding pipe is connected with a bottom of the pressure tank inner cavity and a bottom of the filter tank inner cavity, and a second feeding pipe is connected with a bottom of the depressurization tank inner cavity and the bottom of the filter tank inner cavity, both the first feeding pipe and the second feeding pipe are provided with a feeding pump.

* * * * *